F. STACK.
GEARING.
APPLICATION FILED NOV. 25, 1912.
1,107,721.
Patented Aug. 18, 1914.
5 SHEETS—SHEET 1.
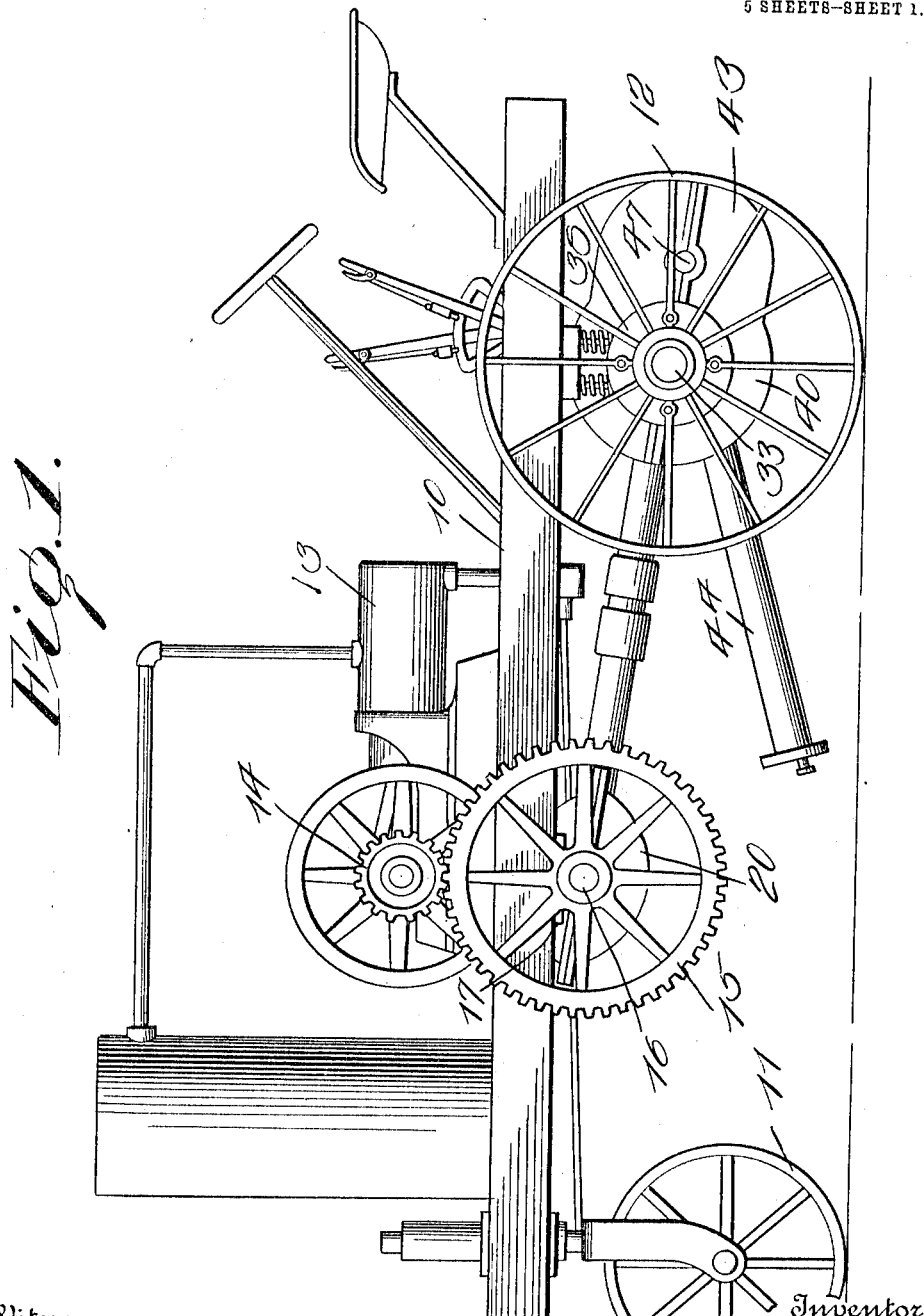
Witnesses
B Gram
Francis Boyle
Inventor
F. Stack
by
Attorney

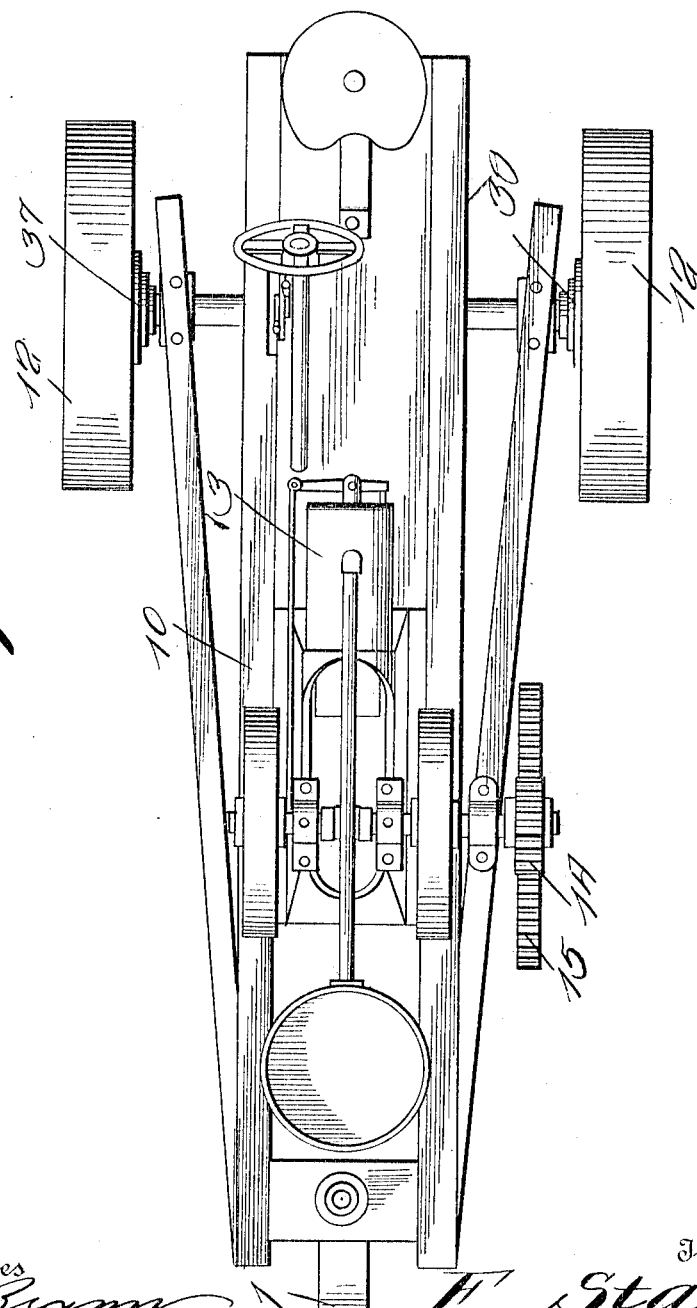

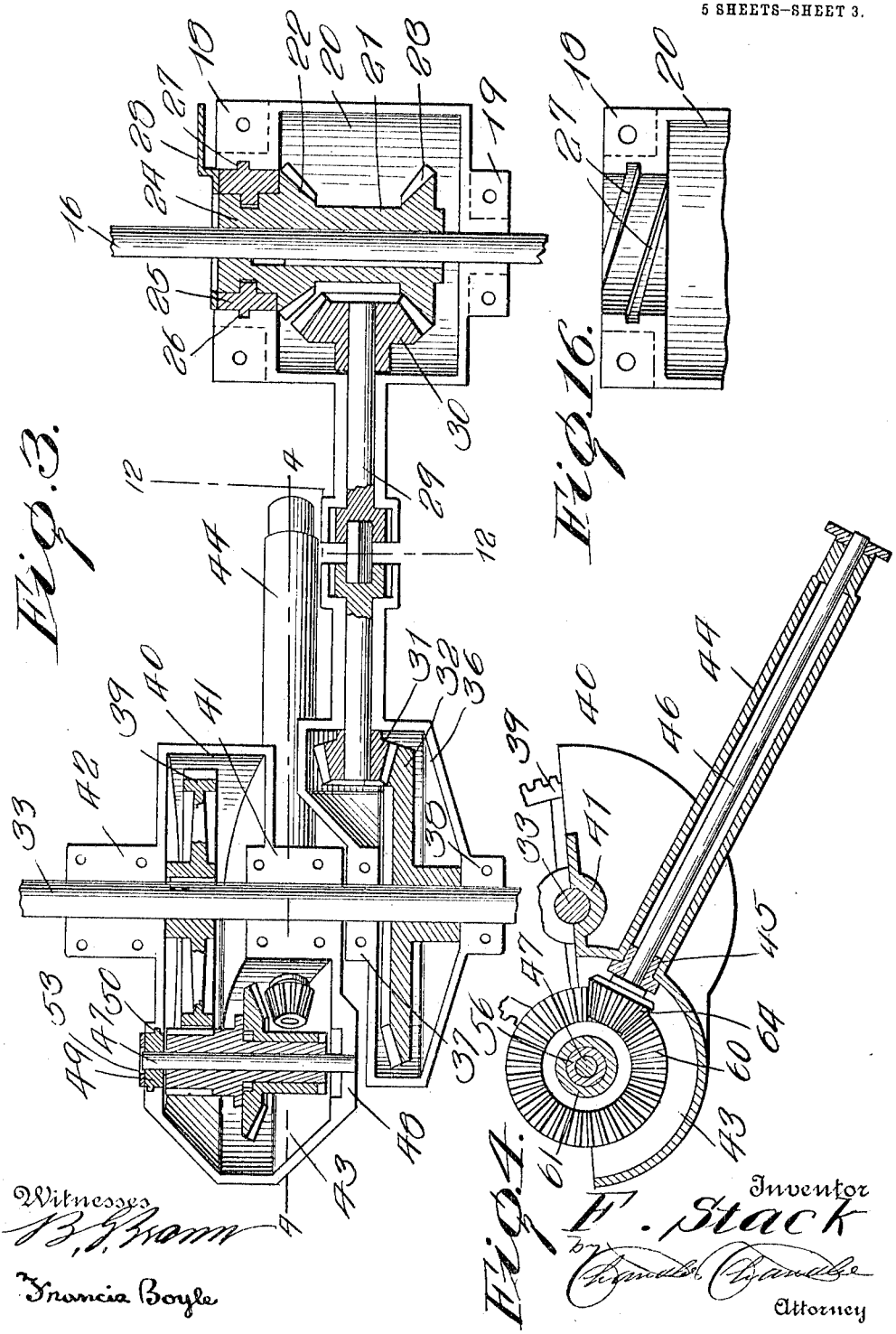

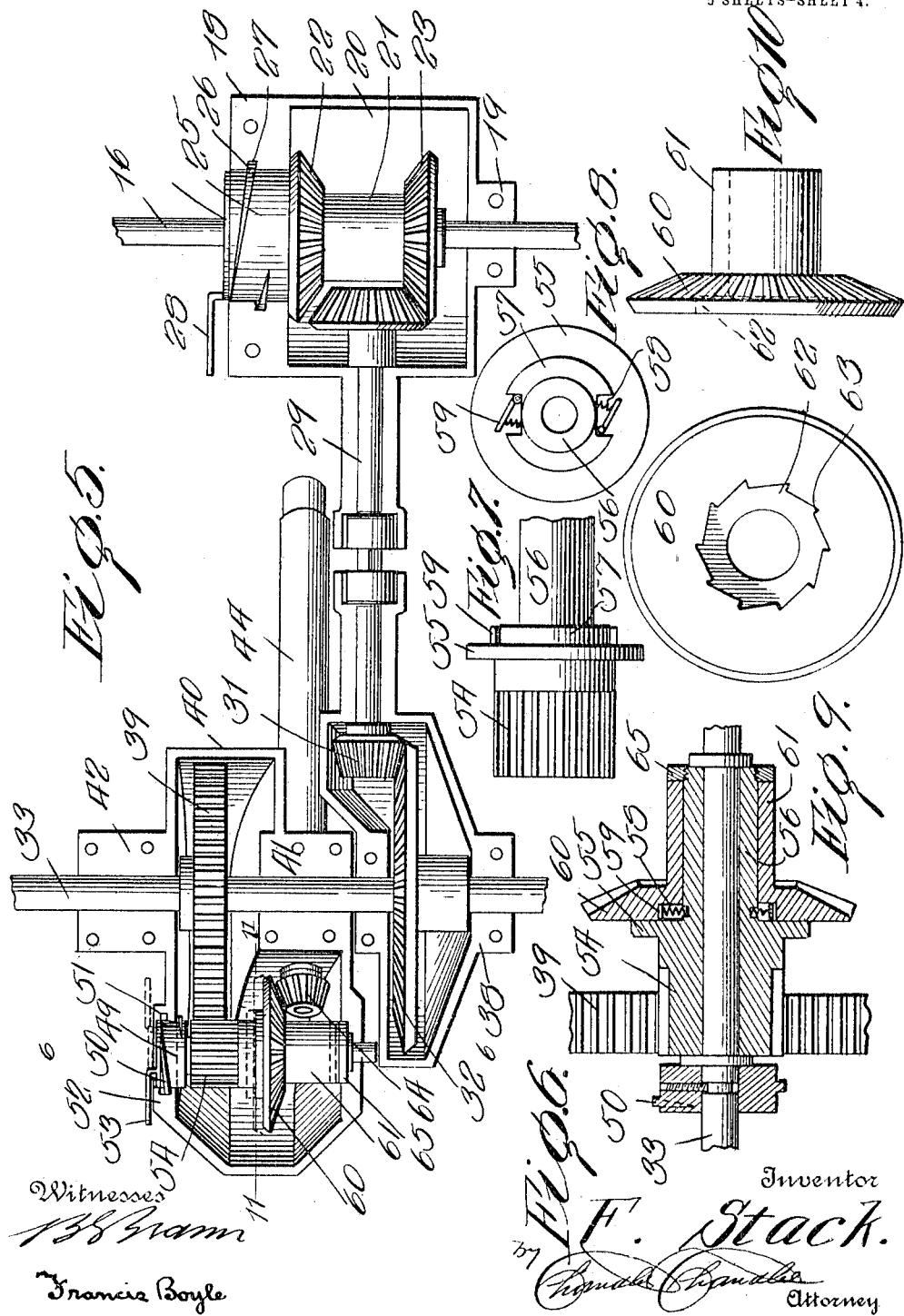
F. STACK.
GEARING.
APPLICATION FILED NOV. 25, 1912.
1,107,721. Patented Aug. 18, 1914.
5 SHEETS—SHEET 4.

F. STACK.
GEARING.
APPLICATION FILED NOV. 25, 1912.
1,107,721.
Patented Aug. 18, 1914.
5 SHEETS—SHEET 5.
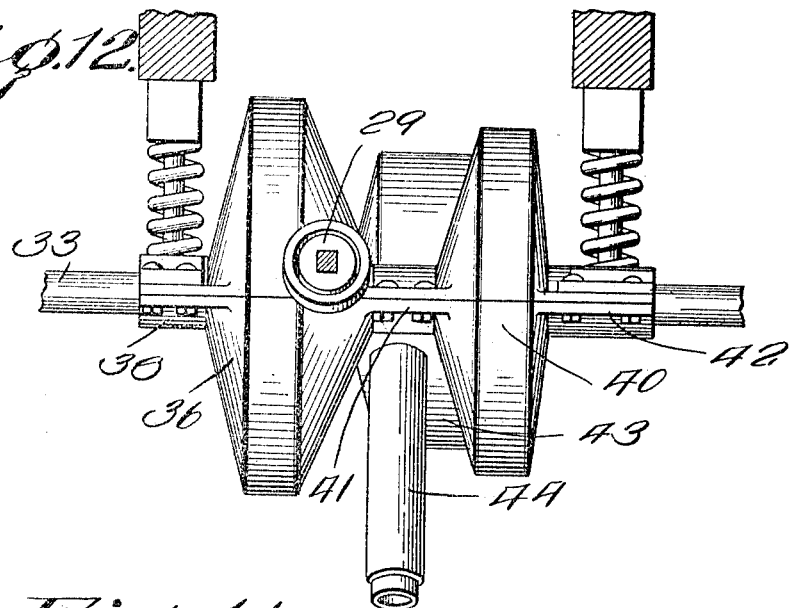
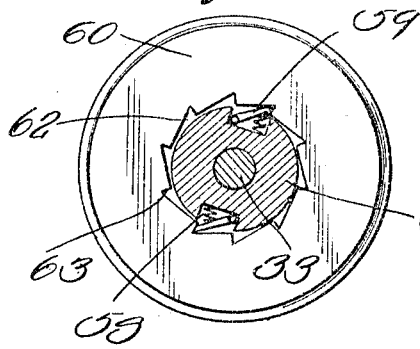
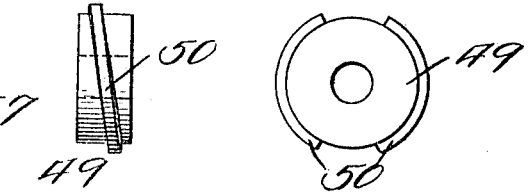
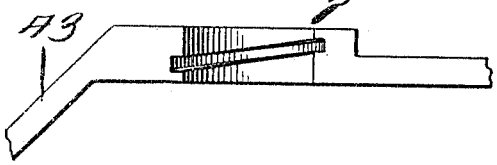
Witnesses
B V Bram
Francis Boyle
Inventor
F. Stack
by Chandler Chandler
Attorney

UNITED STATES PATENT OFFICE.

FRED STACK, OF GARDNER, COLORADO.

GEARING.

1,107,721.   Specification of Letters Patent.   Patented Aug. 18, 1914.

Application filed November 25, 1912. Serial No. 733,520.

*To all whom it may concern:*

Be it known that I, FRED STACK, a citizen of the United States, residing at Gardner, in the county of Huerfano, State of Colorado, have invented certain new and useful Improvements in Gearing; and I do hereby declare the following to be a full, clear, and exact description of the invention, such as will enable others skilled in the art to which it appertains to make and use the same.

This invention relates to gearings for tractors and has for an object to provide a tractor having a novel gearing for attaching various farming implements.

A further object of the invention is to provide a novel driving shaft which is driven by the rear axle of the tractor and in turn drives a downwardly and forwardly sloping shaft to which the various farming implements may be attached, there being novel means for preventing rotation of said driving shaft except in one direction, and there further being novel clutch means for throwing said driving shaft in and out of gear.

With the above objects in view the invention consists of certain novel details of construction and combination of parts hereinafter fully described and claimed, it being understood that various modifications may be made in the minor details of construction within the scope of the appended claims.

In the accompanying drawings forming part of this specification:—Figure 1 is a side elevation of the tractor embodying my improvements. Fig. 2 is a plan view. Fig. 3 is an enlarged sectional view taken on the line 3—3 Fig. 1. Fig. 4 is a longitudinal sectional view taken on the line 4—4 Fig. 3. Fig. 5 is an enlarged plan view with the top section of the farm implement driving mechanism casing removed to expose the driving mechanism, and showing in dotted lines the mechanism out of gear. Fig. 6 is a cross sectional view taken on the line 6—6 Fig. 5. Fig. 7 is a side elevation of one member of the ratchet clutch. Fig. 8 is an end elevation of the member shown in Fig. 7. Fig. 9 is a side elevation of the other member of the ratchet clutch. Fig. 10 in an end elevation of the member shown in Fig. 9. Fig. 11 is a cross sectional view taken on the line 11—11 Fig. 5. Fig. 12 is a cross sectional view taken on the line 12—12 Fig. 3. Fig. 13 is a view in elevation of a threaded shifting collar. Fig. 14 is an end view of the collar. Fig. 15 is a fragmentary plan view showing the screw thread in the collar bearing. Fig. 16 is a fragmentary plan view showing the screw threads in the power shaft casing.

Referring now to the drawings in which like characters of reference designate similar parts, the tractor comprises a main frame 10 which is equipped at the front end with a dirigible ground wheel 11 and at the rear end with traction ground wheels 12. An internal combustion engine 13 is mounted on the main frame, the engine crank shaft being equipped with a pinion 14 which meshes with a gear 15 on a power shaft 16 which is journaled at the ends in hangers 17 that depend from the frame.

The power shaft 16 is journaled in bearings 18 and 19 carried by a gear case 20 of the general shape shown. A sleeve 21 is slidably fitted on the shaft and is provided at the ends with bevel gears 22 and 23, the gear 22 being provided with an integral collar 24 upon which is mounted a loose ring 25 having peripheral screw threads 26 that engage screw threads 27 formed in the bearing 18. An operating lever 28 is fixed to the ring and may be manually rotated to rotate the ring and shift the sleeve 21 through the instrumentality of the screw thread connection of the ring and casing.

A transmission shaft 29 is provided at one end with a bevel gear 30 disposed between the sleeve bevel gears 22 and 23, and is provided at the opposite end with a bevel gear 31 which meshes with a bevel gear 32 fixed to the rear axle 33, the shaft being journaled in suitable bearings on the above mentioned gear case 20 and a gear case 36 which surrounds the axle bevel gear 32. By shifting the sleeve 21 either of the sleeve bevel gears may be engaged with the shaft bevel gear 30 to rotate the shaft in either direction in order to advance or back the tractor. The traction wheels are connected to the ends of the rear axle through the instrumentality of differential gear mechanisms 37 and 38.

For transmitting power to a sickle-bar, or other moving mechanism, a spur gear 39 is fixed to the axle 33 and is housed in a gear case 40 which is provided with lateral alined tubular bearings 41 and 42 that surround the rear axle 33, the gear case having on the rear side an integral extension 43 into which opens a tubular casing 44 that extends downwardly and forwardly along the inner side of the gear case 40 and is provided internally with bearings 45 in which a shaft 46 is axially journaled in the tubular housing. The lower end of this shaft is designed to be operatively connected to any desired farming implement in any suitable manner, the said implement being preferably secured to and carried along by the tractor.

For operatively connecting the shaft 46 for rotation with the rear axle 33, the following novel mechanism is employed. A counter stub shaft 47, which will be hereinafter referred to as a driving shaft, is slidably fitted at one end in a bearing 48 carried by the gear case extension 43, and extends parallel with the rear axle 33. The opposite end of the shaft is revolubly mounted in a collar 49 which is provided with peripheral screw threads 50 that engage in screw threads 51 formed in a bearing 52 carried by the said gear case extension. An operating lever 53 is secured to the collar and may be manually rotated to rotate the collar and shift the driving shaft through the instrumentality of the screw thread connection between the collar and bearing. A gear 54 of about twice the width of the axle gear 39 is fixed on the driving shaft 47 and meshes with and is adapted to be slid laterally across the teeth of the axle gear when the shaft 47 is shifted. The gear 54 is provided with a stop flange 55 and is formed with a reduced hub 56 beyond the flange, there being an annular shoulder 57 disposed at the juncture of the flange and hub. Recesses 58 are formed at diametrically opposite points in the periphery of the shoulder, and spring pressed pivoted dogs 59 are disposed in these recesses. A bevel gear 60 is provided on the toothed side with an axial sleeve 61 which loosely receives the hub 56, and is equipped on the blank side with a recess 62 which receives the shoulder 57. The edge of the recess is cut away to form ratchet teeth 63 which the spur gear dogs 59 engage and lock the gear 54 and bevel gear 60 together for rotation when the tractor is advanced. The bevel gear 60 meshes with a bevel gear 64 carried on the upper end of the farm implement actuating shaft 46 and imparts rotation to the latter. When the tractor is backed the dogs slip over the ratchet teeth and allow the bevel gear 60 to idle whereby no movement is imparted to the shaft 46.

The gear 54 and the bevel gear 60 are held together on the shaft 47 by means of a retaining ring 65 which is secured to the hub 56 and bears against the edge of the sleeve 61, the ring holding the bevel gear bearing with its blank face against the stop flange 55. Since the gear 54 is fixed to the shaft 47, and the bevel gear 60 is secured to the gear 54, the bevel gear 60 will be withdrawn from engagement with the implement actuating shaft bevel gear 64 when the shaft 47 is shifted in one direction, and will be moved into engagement with the implement actuating shaft bevel gear when the shaft 47 is shifted in the opposite direction.

From the above description it will be seen that by virtue of the novel ratchet and dog connection between the gear 54 and gear 60, the implement actuating shaft 47 will be rotated in one direction only, and furthermore, it will be seen that the implement actuating shaft may be readily thrown into or out of gear by simply shifting the operating lever 53.

What is claimed, is:—

1. The combination with a traction axle, of a downwardly inclined power transmission shaft, and interfitting gears having a ratchet and dog connection with each other and forming an operative connection between the axle and the upper end of said power transmission shaft permitting of rotation of said shaft by said axle in but one direction.

2. The combination with a driven axle, of a downwardly inclined power transmission shaft, a counter-shaft, a gear on said axle, interfitting gears on said counter-shaft having a ratchet and dog connection with each other and one of said gears meshing with said axle gear and forming an operative connection between the axle and the upper end of said power transmission shaft permitting of rotation of said shaft by said axle in but one direction.

3. The combination with a traction axle, of a power transmission shaft, a counter stub shaft extending parallel with said axle, a gear on said axle, interfitting gears on said counter shaft having a ratchet and dog connection with each other, said axle gear meshing with one of said interfitting gears, a gear on said power transmission shaft adapted to mesh with the other of said gears, and means for shifting said counter shaft longitudinally of said axle whereby to bodily shift said intermeshing gears toward and away from said transmission shaft gear whereby to throw said transmission shaft into and out of gear with the first named shaft.

4. The combination with a traction axle, of spaced bearings on one side of said axle, a counter shaft extending parallel with said axle and having one end revolubly and slidably fitted in one of said bearings, a collar revolubly receiving the opposite end of said shaft and having a screw thread connection with the other of said bearings, an operating lever for rotating said collar whereby to shift said shaft longitudinally of said axle, an operative connection between said shaft and said axle, a power transmission shaft, and a gear connection between said transmission shaft and said counter shaft, said gear connection being adapted to be thrown into operative and released position by shifting movement of said counter shaft longitudinally of said axle.

5. The combination with a revoluble traction axle, of a counter shaft extending parallel with said axle, a gear on said axle, a gear on said shaft adapted to be slid longitudinally across and continuously meshing with said axle gear, and having a hub extension, a bevel gear mounted to idle on said hub extension, a ratchet and dog connection between said shaft gear and said bevel gear permitting of rotation of said bevel gear by said shaft gear in but one direction, a power transmission shaft, a bevel gear on said power transmission shaft, and means for shifting said counter shaft longitudinally of said axle whereby to carry the first named bevel gear into and out of mesh with the last named bevel gear.

In testimony whereof, I affix my signature, in the presence of two witnesses.

FRED STACK.

Witnesses:
GEO. J. INGRAHAM,
J. B. HUDSON.

Copies of this patent may be obtained for five cents each, by addressing the "Commissioner of Patents, Washington, D. C."